May 7, 1946.                R. E. BANKER                2,399,658
              SINGLE KNOB VARIABLE DENSITY FILTER CONTROL
                    Filed March 8, 1944         2 Sheets-Sheet 1

INVENTOR
RUSSELL E. BANKER
BY
ATTORNEY

May 7, 1946. R. E. BANKER 2,399,658
SINGLE KNOB VARIABLE DENSITY FILTER CONTROL
Filed March 8, 1944 2 Sheets-Sheet 2

INVENTOR
RUSSELL E. BANKER
BY W. Glenn Jones
ATTORNEY

Patented May 7, 1946

2,399,658

UNITED STATES PATENT OFFICE 2,399,658

SINGLE KNOB VARIABLE DENSITY FILTER CONTROL

Russell Ellsworth Banker, Washington, D. C.

Application March 8, 1944, Serial No. 525,509

13 Claims. (Cl. 88—65)

(Granted under the act of March 3, 1883, as amended April 30, 1928; 370 O. G. 757)

This invention relates to a single knob variable density filter control and has for an object to provide an improved means for moving a variable filter device into and out of the path of incident light of an optical instrument, such as a gun or bombsight, and for controlling the operation of the variable filter device when it is in the path of incident light.

A further object of this invention is to a single knob control means for both moving the filter device into and out of operative position and for operating the filter device when it is in operative position in the path of incident light.

Still a further object of this invention is to provide single control means for selectively moving a plurality of filters into and out of the path of incident light of the optical instrument, at least one of which filters is of a variable density type, and for varying the density of such variable density filter which is in the path of incident light.

With the foregoing and other objects in view, as will hereinafter become apparent, this invention comprises the constructions, combinations and arrangements of parts hereinafter described, claimed and illustrated on the accompanying drawings, wherein:

Figure 1:
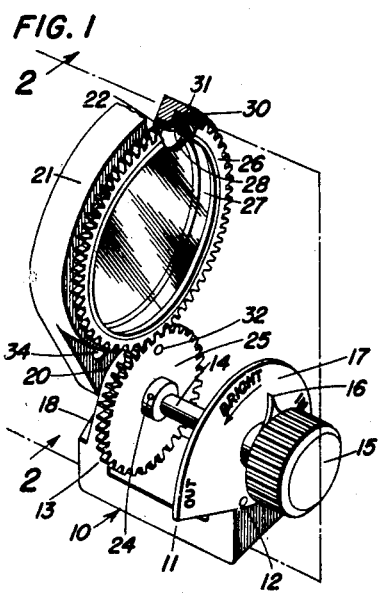
Fig. 1 is a perspective view of one form of this invention, involving only a variable density filter.
Figure 2:
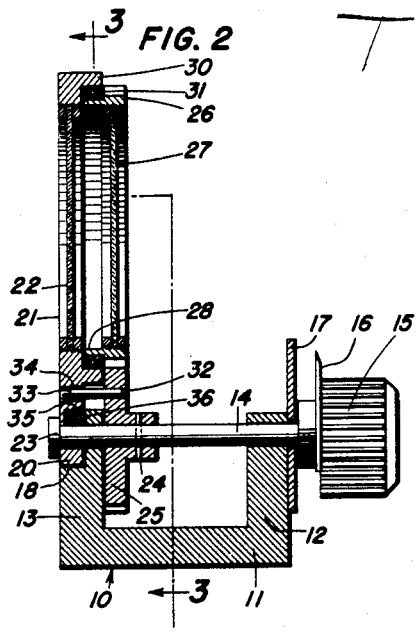
Fig. 2 is a sectional view on lines 2—2 of Fig. 1.
Figure 3:
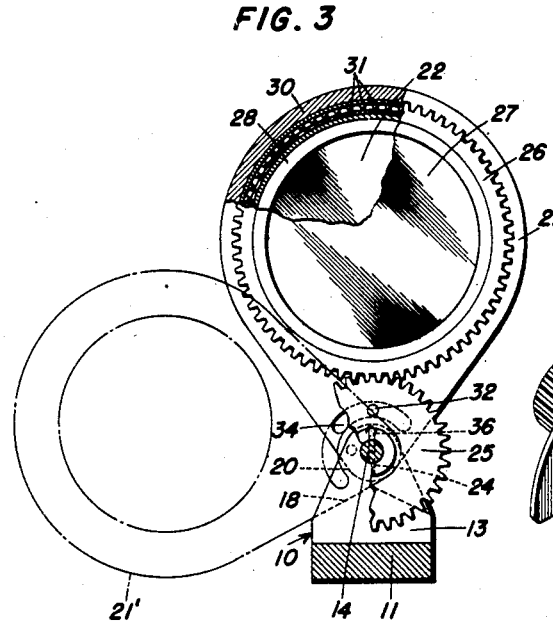
Fig. 3 is a sectional view on lines 3—3 of Fig. 2.

There is shown at 10 in Figs. 1, 2 and 3, one form of the single knob variable density filter control of this invention. This includes a base 11 forming part of or appropriately secured in or to the optical instrument whose incident light is to be subjected to the variable density filter of this invention when desired. Upstanding from the base 11 is a forward stanchion 12 and a rearward stanchion 13 through which are journalled a shaft 14. Pinned to the forward end of the shaft 14 is a knurled control knob 15 carrying a pointer 16 for cooperation with a filter position indicating plate 17 mounted on the forward stanchion 12. The rear stanchion 13 is provided with a pocket 18 in which is located a lobe 20 of a frame 21 having polarizing element 22 fixed therein. This frame lobe 20 is journalled on the shaft 14, being held in the pocket 18 by the shaft head 23.

Pinned to the shaft 14, as at 24 for rotation therewith, is a gear wheel 25 on the forward side of the stanchion 13. Meshed with this gear 25 is a gear 26 carrying a polarizing element 27 therein. This polarizing element gear 27 is provided with an axially extending flange 28 which is rotatable within a flange 30 extending forwardly from the frame 21, ball bearing friction reducing means 31 being provided between the flange 28 of the gear 26 and the flange 30 of frame 21. Extending rearwardly from the gear 25 is a pin 32 whose rearward end 33 is movable within a slot 34 provided in the lobe 20 of frame 21.

In operation, the polarizing filter of this invention, consisting of the polarizing elements 22 and 27, is to be moved into and out of the path of incident light and also the polarizing elements are to be rotated one relative to the other when in the path of incident light, to vary their effectiveness as a filter from the maximum to the minimum and vice versa, all by means of the single control knob 15. When the filter is out of the path of incident light it will be in the position shown in dot-dash outline at 21'.

In Fig. 3 rotation of the control knob 15 in a clockwise direction, moving the point at 16 from the indicia "Out" to the indicia "In" on plate 17, will cause the end 33 of pin 32 extending from gear 25 to contact the upper end of the circular slot 34 and cause the frame 21 to be moved from the position 21' to the position shown at 21 with the polarizing elements 22 and 27 in the relative position at which they pass the maximum light. The spring pressed detent 35 in lobe 20 of frame 21 pressing into a recess 36 in stanchion 13 will hold the frame 21 in this upright position. To cut out some of the light, the knob 15 may be rotated counterclockwise, which in turn rotates gear 25 and polarizing element gear 26 to rotate polarizing element 27 relative to the other polarizing element 22. As the gear rotates, the pin end 33 will move toward the opposite end of slot 34 where the filters 27 and 22 are in a position to cut with the maximum amount of light.

Further rotation of the gear in the same counterclockwise direction will cause the spring pressed detents 35 to release the lobe 20 from its temporary locking attachment to the stanchion 13 and rotate it to the position shown at 21' with the filter removed from the path of incident light. An appropriately located depression in the stanchion 13, similar to the depression 36, serves to hold the frame 21 in the position 21'. To bring the filter back into operation the knob will be reversed or rotated in the clockwise direction. The first rotation of this knob will cause the rotation of the frame 26 until the pin 33 has moved clockwise to the end of slot 34 whereupon continued clockwise rotation will cause the frame to move from position 21' to that at 21, whereupon the density of light passing therethrough may be controlled by counterclockwise or clockwise rotation of knob 15 while the pin end 33 moves within the limits of the slot 34.

Figure 4:
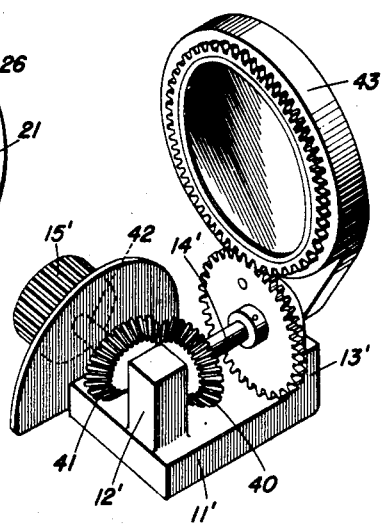
Fig. 4 is a perspective view of a slightly modified form.

In Fig. 4 a slightly modified form of the invention as shown herein, a shaft 14' is provided with a bevelled gear 40 meshing with the bevelled gear 41 on a shaft 42 of a knurled control knob 15', the shaft 14' being journalled between a forward stanchion 12' and a rear stanchion 13' on a base 11'. As a result of this construction, the plane of rotation of the control knob 15' is at right angles to that of the polarizing frame 43. The construction and operation of this form of the invention being otherwise identical with that already described as to Figs. 1, 2 and 3.

Figure 5:
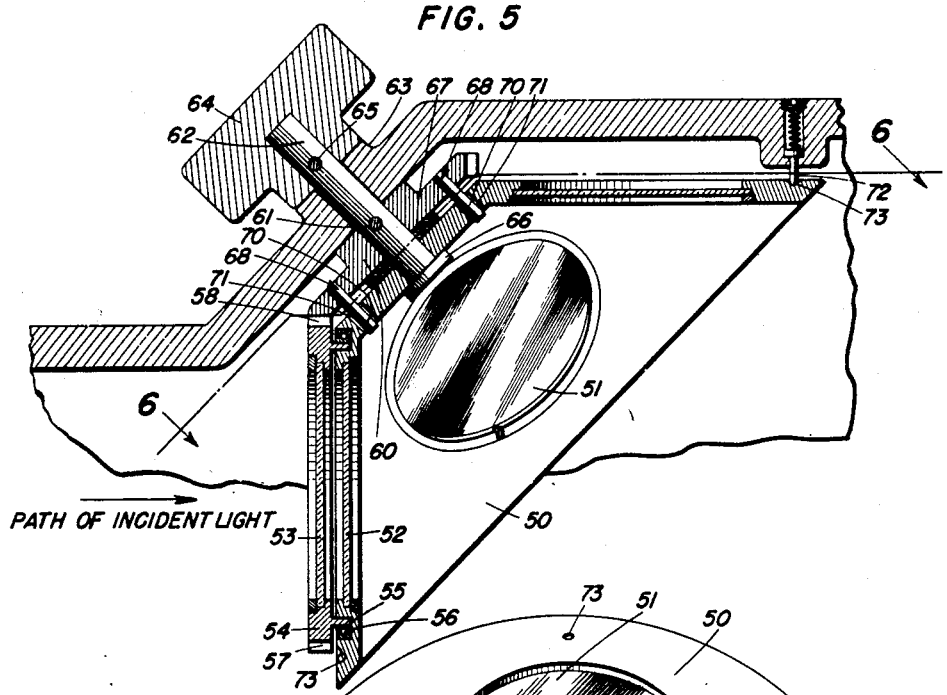
Fig. 5 is a sectional view of another form of this invention, involving several filters.
Figure 6:
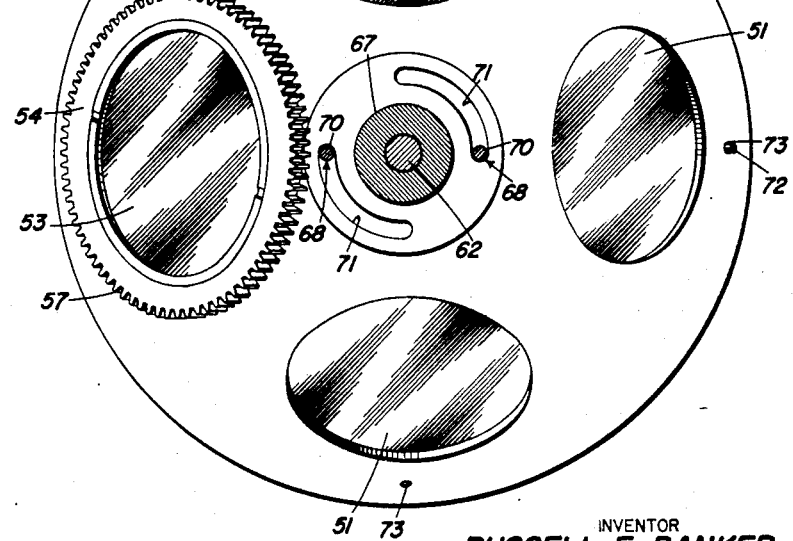
Fig. 6 is a sectional view on lines 6—6 of Fig. 5.

In the form of invention shown in Figs. 5 and 6, a cone 50 is used instead of the frames 21 and 43. This cone 50 carries a plurality of filter elements 51 in addition to the relatively fixed polarizing element 52. Cooperating with this polarizing element 52 is a second relatively movable polarizing element 53 mounted in a gear frame 54 having an axially extending flange 55 mounted for rotation on ball bearings 56 in a recess in the cone 50 surrounding the polarizing element 52. The gear teeth 57 on gear frame 54 are in mesh with bevelled teeth 58 of a gear 60 pinned at 61 on a shaft 62 journalled through a base 63, a knurled controlled knob 64 being pinned at 65 to the shaft 60 outside of the base 63.

The other end of the shaft 62 is provided with a head 66 for holding the cone 50 in position against a spacing washer 67 between the cone 50 and the gear 60. Extending from the gear 60 are a pair of pins 68 whose ends 70 are movable in slots 71 in the cone 50. A spring pressed detent 72 in the base 63 cooperates with any one of a plurality of depressions 73 in cone 50 for holding the cone 50 in any one selected position.

The operation of this form is substantially identical with that of the previous forms. When the polarizing elements 52 and 53 are in the path of incident light the density of light passing therethrough may be controlled from the maximum to the minimum and vice versa by rotating the control knob 64 while the pin ends 70 move within the limits of the slots 71. When it is desired to substitute one of the other filters 51 for the polarizing elements 52 and 53 knob 64 is merely rotated with the pin ends 70 at one end of their slots 71 causing the cone 50 to rotate about the shaft 62 until the selected filter 51 is in proper position and held in such proper position against accidental movement therefrom between spring pressed detent 72 in the appropriate cone depression 73. If the polarizing elements are again desired, rotation is continued until the polarizing elements are again in the path of incident light and then the rotation of the knob 64 may be reversed and manipulated to control the density of the light passing therethrough.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. A single knob control means for both adjusting an adjustable filter in the path of incident light of a light receiving instrument and for moving said adjustable filter into and out of the path of incident light comprising a pivoted common filter support, said adjustable filter including two polarizing filter members, one rotatable relative to the other, mounted on said common support, a shaft on which said support is pivoted, a control knob fixed on said shaft, gear means fixed on said shaft connecting to one of said filter members for causing rotation thereof relative to the other of said filter members, pin and slot means connecting said gear means to said pivoted filter support limiting the relative rotation of said filter members to each other and causing said gear means to pivot said filter support after the limit of filter member rotation has been reached.

2. A single knob control means for both adjusting an adjustable filter in the path of incident light of a light receiving instrument and for moving said adjustable filter into and out of the path of incident light comprising a pivoted common filter support, said adjustable filter including two polarizing filter members, one rotatable relative to the other, mounted on said common support, a shaft on which said support is pivoted, a control knob fixed on said shaft, gear means fixed on said shaft connecting to one of said filter members for causing rotation thereof relative to the other of said filter members, pin and slot means connecting said gear means to said pivoted filter support limiting the relative rotation of said filter members to each other and causing said gear means to pivot said filter support after the limit of filter member rotation has been reached, and detent means releasably holding said pivoted support against accidental rotation.

3. A single knob control means for both adjusting an adjustable filter in the path of incident light of a light receiving instrument and for moving said adjustable filter into and out of the path of incident light comprising a pivoted common filter support, said adjustable filter including two polarizing filter members, one rotatable relative to the other mounted on said common support, a plurality of additional filters mounted in said support, a shaft on which said support is pivoted, a control knob fixed on said shaft, gear means fixed on said shaft connecting to one of said filter members for causing rotation thereof relative to the other of said filter members, pin and slot means connecting said gear means to said pivoted filter support limiting the relative rotation of said filter members to each other and causing said gear means to pivot said filter support after the limit of filter member rotation has been reached to selectively place any one of said plurality of filters in the path of incident light.

4. A single knob control means for both adjusting an adjustable filter in the path of incident light of a light receiving instrument and for moving said adjustable filter into and out of the path of incident light comprising a pivoted common filter support, said adjustable filter including two polarizing filter members, one rotatable relative to the other mounted on said common support, a plurality of additional filters mounted in said support, a shaft on which said support is pivoted, a control knob fixed on said shaft, gear means fixed on said shaft connecting to one of said filter members for causing rotation thereof relative to the other of said filter members, pin and slot means connecting said gear means to said pivoted filter support limiting the relative rotation of said filter members to each other and causing said gear means to pivot said filter support after the limit of filter member rotation has been reached to selectively place any one of said plurality of filters in the path of incident light, and detent means releasably holding said support against accidental rotation to maintain said selected filter in proper position.

5. A single knob control means for both adjusting an adjustable filter in the path of incident light of a light receiving instrument and for moving said adjustable filter into and out of the path of incident light comprising a pivoted common filter support, said adjustable filter including two polarizing filter members, one rotatable relative to the other, mounted on said common support, a shaft on which said support is pivoted, a control knob fixed on said shaft, gear means fixed on said shaft connecting to one of said filter members for causing rotation thereof relative to the other of said filter members, lost motion means connecting said gear means to said pivoted filter support limiting the relative rotation of said filter members to each other and causing said gear means to pivot said filter support after the limit of filter member rotation has been reached.

6. A filter device for a light receiving instrument comprising a base, a shaft journalled on said base, a frame pivotally mounted on said shaft, filter means mounted in said frame, said filter means including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, and a lost motion means connecting said frame and said shaft for limiting the relative pivotal movement between said frame and said shaft.

7. A filter device for a light receiving instrument comprising a base, a shaft journalled on said base, a frame pivotally mounted on said shaft, filter means mounted in said frame, said filter means including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, a lost motion means connecting said frame and said shaft for limiting the relative pivotal movement between said frame and said shaft, and spring pressed detent means releasably holding said frame in any one of a plurality of selected positions against unintentional rotation.

8. A filter device for a light receiving instrument comprising a base, a shaft journalled on said base, a frame pivotally mounted on said shaft, filter means mounted in said frame, said filter means including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, a lost motion means connecting said frame and said shaft for limiting the relative pivotal movement between said frame and said shaft, and a single knob for rotating said shaft to thereby rotate said frame to bring said filter member into and out of the path of incident light of the light receiving instrument and to adjust said polarizing filter members relative to each other when in the path of incident light.

9. A filter device for a light receiving instrument comprising a base, a shaft journalled on said base, a frame pivotally mounted on said shaft, filter means mounted in said frame, said filter means including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, a lost motion means connecting said frame and said shaft for limiting the relative pivotal movement between said frame and said shaft, a single knob for rotating said shaft to thereby rotate said frame to bring said filter member into and out of the path of incident light of the light receiving instrument and to adjust said polarizing filter members relative to each other when in the path of incident light, and a bevel gear means connecting said knob to said shaft.

10. A filter device for a light receiving instrument comprising a base, a shaft journalled on said base, a frame pivotally mounted on said shaft, filter means mounted in said frame, said filter means including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, and a pin and slot means connecting said frame and said shaft for limiting the relative pivotal movement between said frame and said shaft.

11. A filter device for a light receiving instrument comprising a base, a shaft journalled on said base, a frame pivotally mounted on said shaft, filter means mounted in said frame, said filter means consisting of a plurality of filters, one of said filters including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, a pin and slot means connecting said frame and said shaft for limiting the relative pivotal movement between said frame and said shaft, spring pressed detent means releasably holding said frame in any one of a plurality of selected positions against unintentional rotation, a single knob for rotating said shaft to thereby rotate said frame to bring a selected filter into and out of the path of incident light of the light receiving instrument and to adjust said polarizing filter member relative to each other when in the path of incident light, and a bevel gear means connecting said knob to said shaft.

12. A filter device for a light receiving instrument comprising a base, a shaft journalled on said base, a frame pivotally mounted on said shaft, filter means mounted in said frame, said filter means consisting of a plurality of filters, one of said filters including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, and a pin and slot means connecting said frame and said shaft for limiting the relative pivotal movement between said frame and said shaft.

13. A filter device for a light receiving instrument comprising a base, a shaft journalled on said base, a frame pivotally mounted on said shaft, said frame being substantially frustum-cone shaped, said frame being pivoted about its axis, filter means consisting of a plurality of filters mounted about the conical walls of said frame, one of said filters including a pair of polarizing filter members, one of said polarizing filter members being fixed in said frame, the second of said polarizing filter members being mounted for rotation relative to said first polarizing filter member, a gear member concentrically mounted on said second polarizing filter member for controlling its rotation, a gear member fixed on said shaft for operating said second polarizing filter member gear member, a lost motion means connecting said frame and said shaft for limiting the relative pivotal movement between said frame and said shaft, spring pressed detent means releasably holding said frame in any one of a plurality of selected positions against unintentional rotation, a single knob for rotating said shaft to thereby rotate said frame to bring a selected filter into and out of the path of incident light of the light receiving instrument and to adjust said polarizing filter members relative to each other when in the path of incident light.

RUSSELL ELLSWORTH BANKER.